(12) United States Patent
Jung

(10) Patent No.: US 11,732,635 B2
(45) Date of Patent: Aug. 22, 2023

(54) AIR RELEASE STRUCTURE OF INTEGRATED FLOW CONTROL MECHANISM

(71) Applicants: HYUNDAI MOTOR COMPANY, Seoul (KR); Kia Corporation, Seoul (KR)

(72) Inventor: Il Jung, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 17/848,886

(22) Filed: Jun. 24, 2022

(65) Prior Publication Data

US 2022/0412247 A1 Dec. 29, 2022

(30) Foreign Application Priority Data

Jun. 28, 2021 (KR) .................. 10-2021-0083761

(51) Int. Cl.
| | |
|---|---|
| *F01P 3/20* | (2006.01) |
| *F01P 7/16* | (2006.01) |
| *F01P 7/14* | (2006.01) |
| *F01P 11/02* | (2006.01) |

(52) U.S. Cl.
CPC .............. *F01P 3/20* (2013.01); *F01P 7/16* (2013.01); *F01P 2007/146* (2013.01); *F01P 2011/0233* (2013.01); *F01P 2060/08* (2013.01)

(58) Field of Classification Search
CPC ......... F01P 2007/146; F01P 2011/0233; F01P 7/16; F01P 3/20
See application file for complete search history.

(56) References Cited

U.S. PATENT DOCUMENTS

| | | | | |
|---|---|---|---|---|
| 3,901,475 A | * | 8/1975 | Dreibelbis | ............ F16K 15/044 |
| | | | | 137/513.5 |
| 6,681,805 B2 | * | 1/2004 | McLane | .............. F16K 11/0856 |
| | | | | 137/625.16 |

FOREIGN PATENT DOCUMENTS

EP 1806488 A1 * 7/2007 ................ F01P 7/16

* cited by examiner

*Primary Examiner* — Kevin A Lathers
(74) *Attorney, Agent, or Firm* — Morgan, Lewis & Bockius LLP

(57) ABSTRACT

An air release structure of an integrated flow control mechanism includes a flow control housing, a radiator nipple provided on an upper portion of the flow control housing and forming a bypass passage portion together with the flow control housing, a float provided in the bypass passage portion and an elastic member to support the float elastically and to selectively open the bypass passage portion.

18 Claims, 5 Drawing Sheets

AIR RELEASE STRUCTURE OF INTEGRATED FLOW CONTROL MECHANISM

CROSS-REFERENCE TO RELATED APPLICATION

The present application claims priority to Korean Patent Application No. 10-2021-0083761 filed on Jun. 28, 2021, the entire contents of which is incorporated herein for all purposes by this reference.

BACKGROUND OF THE PRESENT DISCLOSURE

Field of the Present Disclosure

The present disclosure relates to an air release structure of an integrated flow control mechanism. More particularly, the present disclosure relates to an air release structure of an integrated flow control device capable of suppressing the generation of heater flowing noise.

Description of Related Art

The integrated flow control mechanism distributes coolant exhausted from the engine to radiators, heaters, and oil warmers.

In the stop condition of stopping the coolant flow in winter, the air collected at the top of the integrated flow control device is not expelled to the radiator but inflows to the heater port, causing flowing noise in the heater core.

There is also a case where a constant degassing line is applied to the integrated flow control mechanism by applying a pressurized cooling system to bleed air, but heat loss occurs due to the constant flow of coolant, which leads to fuel efficiency and heating aspects adversely.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an air release structure of an integrated flow control mechanism configured for suppressing the generation of flow noise by evacuating air in a state in which there is no cooling water flow.

An air release structure of an integrated flow control mechanism according to various exemplary embodiments of the present disclosure may include a flow control housing, a radiator nipple provided on an upper portion of the flow control housing and forming a bypass passage portion together with the flow control housing, a float provided in the bypass passage portion and an elastic member to support the float elastically and to selectively open the bypass passage portion.

The elastic member may include a wave spring.

The bypass passage portion may be formed on a side of a coupling portion of the radiator nipple and the flow control housing.

The air release structure according to various exemplary embodiments of the present disclosure may further include a retainer provided to fix the radiator nipple to the flow control housing.

The retainer may support the elastic member.

The retainer may include an upper body supporting the elastic member and a lower body extending from the upper body and forming a passage together with the radiator nipple.

The air release structure according to various exemplary embodiments of the present disclosure may further include a ball valve provided inside the flow control housing to control coolant flow according to a rotation of the ball valve and a radiator seal provided to contact with the ball valve.

The air release structure according to various exemplary embodiments of the present disclosure may further include a lip seal mounted between the radiator seal and the radiator nipple.

The air release structure according to various exemplary embodiments of the present disclosure may further include an O-ring mounted between the radiator nipple and the flow control housing.

The air release structure according to various exemplary embodiments of the present disclosure may further include a heater nipple mounted to the flow control housing.

The air release structure according to various exemplary embodiments of the present disclosure may further include a heat-exchange nipple mounted to the flow control housing.

The bypass passage portion may include an outlet formed on the radiator nipple and selectively blocked by the float, a bypass chamber provided with the float and the elastic member and having a diameter greater than a diameter of the outlet and a passage with a diameter smaller than the diameter of the bypass chamber.

The air release structure according to various exemplary embodiments of the present disclosure may further include a retainer including an upper body supporting the elastic member and a lower body extending from the upper body and forming the passage between the lower body and the radiator nipple.

A seating groove may be formed to accommodate the elastic member on the upper body.

The bypass passage portion may further include an inlet formed between the radiator nipple and the flow control housing.

The air release structure of the integrated flow control mechanism according to the exemplary embodiment of the present disclosure is a simple configuration, and air release is properly performed to suppress the flow in the heater core.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
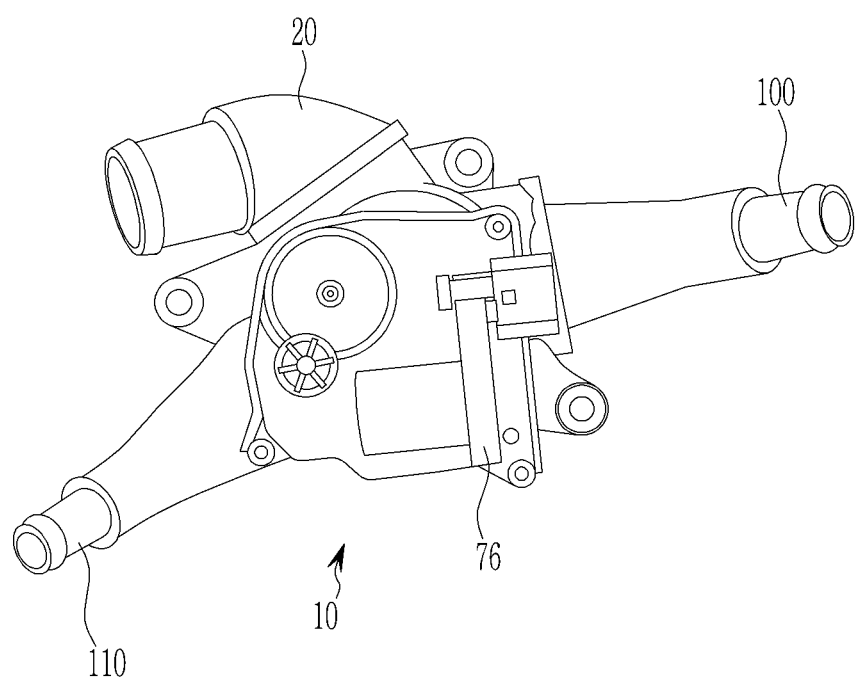
FIG. 1 is a front view of an integrated flow control mechanism according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

To clearly explain an exemplary embodiment of the present disclosure, parts irrelevant to the description are omitted, and the same reference numerals are assigned to the same or similar elements throughout the specification.

Because the size and thickness of each component shown in the drawings are arbitrarily indicated for convenience of description, the present disclosure is not necessarily limited to that shown in the drawings, and the thickness is enlarged to clearly express various parts and regions.

Furthermore, in the following detailed description, the reason that the names of components are divided into first, second, etc. is to classify them in the same relationship, and it is not necessarily limited to the order in the following description.

Throughout the specification, when a part includes a certain element, it means that other elements may be further included, rather than excluding other elements, unless specifically stated otherwise.

Furthermore, terms such as . . . part, . . . means described in the specification mean a unit of a comprehensive configuration that performs at least one function or operation.

When a part, such as a layer, film, region, plate, etc., is "on" another part, this includes not only the case where it is directly above the other part, but also the case where there is another part in between.

In contrast, when an element is referred to as being "directly on" another element, there are no intervening elements present.

Various exemplary embodiments of the present disclosure will hereinafter be described in detail with reference to the accompanying drawings.

Figure 2:
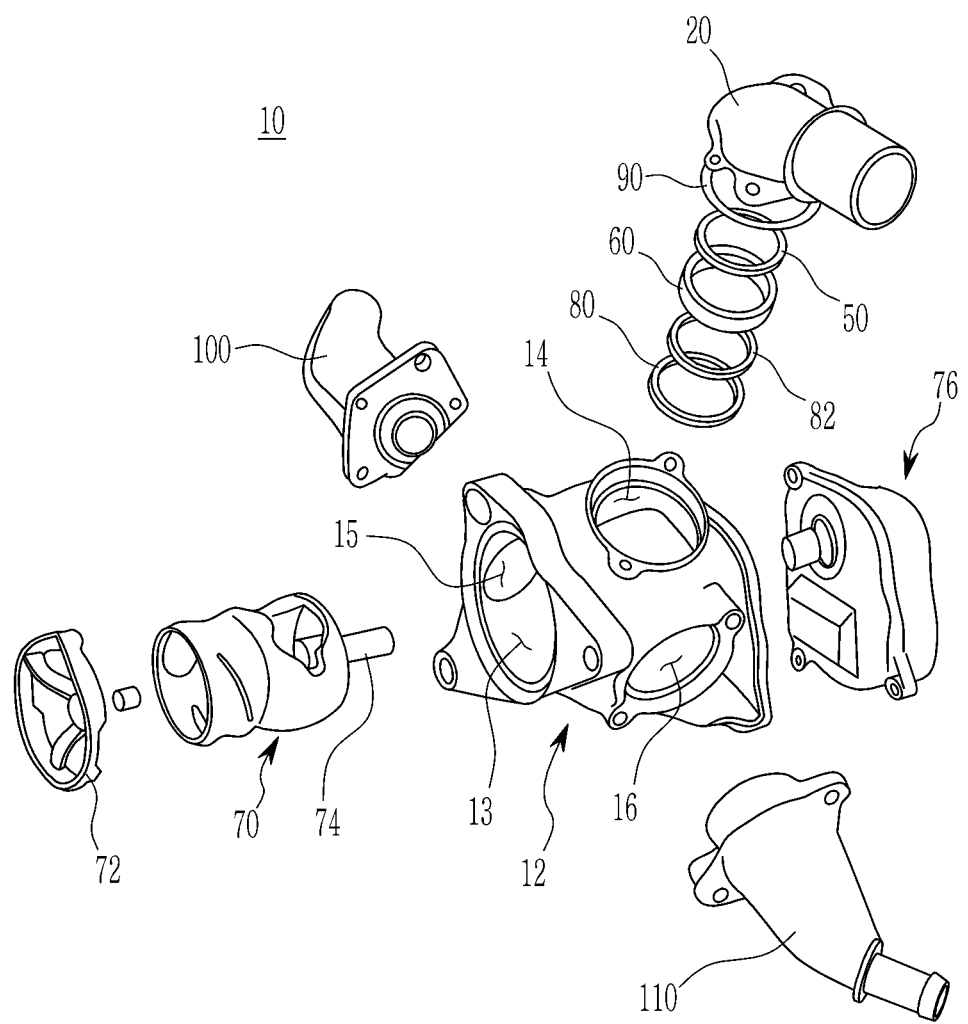
FIG. 2 is an exploded perspective view of an integrated flow control mechanism according to various exemplary embodiments of the present disclosure.

FIG. 1 is a front view of an integrated flow control mechanism according to various exemplary embodiments of the present disclosure, and FIG. 2 is an exploded perspective view of an integrated flow control mechanism according to various exemplary embodiments of the present disclosure.

Referring to FIG. 1 and FIG. 2, an integrated flow control mechanism to which the air release structure according to the exemplary embodiment of the present disclosure may be applied will be described.

An integrated flow control mechanism 10 according to various exemplary embodiments of the present disclosure functions to distribute coolant exhausted from an engine.

For example, the integrated flow control mechanism 10 may be an integrated thermal management module (ITM).

The integrated flow control mechanism 10 may include a flow control housing 12 provided with an inlet port 13 through which coolant inflows from the engine, a radiator port 14 that exhausts the coolant through a radiator, a heater port 15 that exhausts the coolant through a heater, and a heat-exchange port 16 for exhausting coolant to a heat exchanger such as an Auto Transmission Fluid Warmer (ATF warmer).

Furthermore, the integrated flow control mechanism 10 may further include a radiator nipple 20 mounted on the radiator port 14, a heater nipple 100 mounted on the heater port 15, and a heat-exchange nipple 110 mounted on the heat-exchange port 16, a ball valve 70 provided inside the flow control housing 12 to control the coolant flow according to its rotation, a valve axis 74 connected to the ball valve 70 and an actuator 76 to selectively rotate the valve axis 74.

Furthermore, the integrated flow control mechanism 10 may further include an assembly support 72 for supporting the ball valve 70.

A controller is configured to control the operation of the actuator 76 according to information such as coolant temperature, oil temperature and the like, and the ball valve 70 connected to the valve axis 74 rotates to cut off or distribute coolant.

The control of the controller and general operation of the integrated flow control mechanism 10 are obvious to those skilled in the art, and thus a detailed description thereof will be omitted.

Figure 3:
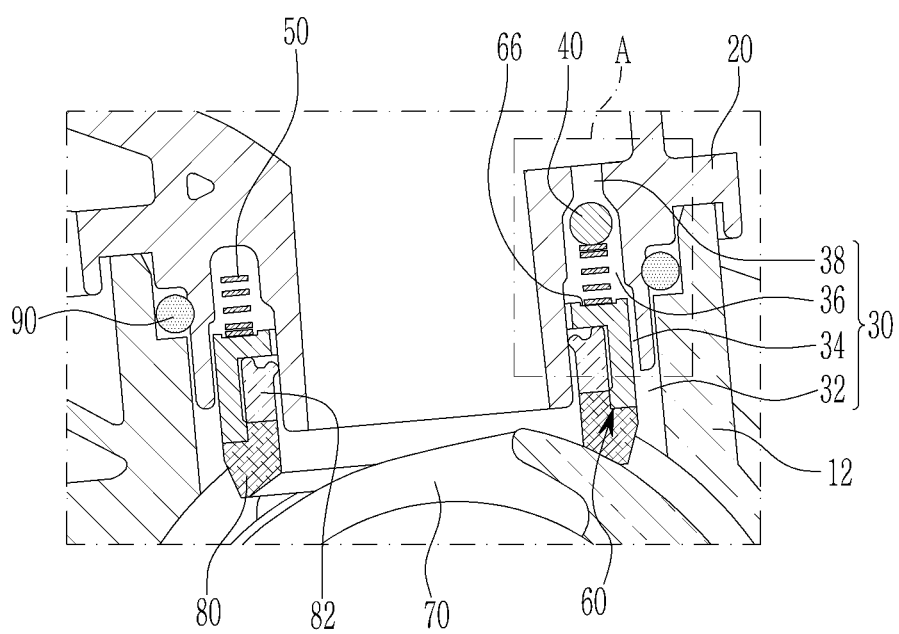
FIG. 3 is a cross-sectional view showing an air release structure of an integrated flow control mechanism according to various exemplary embodiments of the present disclosure.
Figure 4:
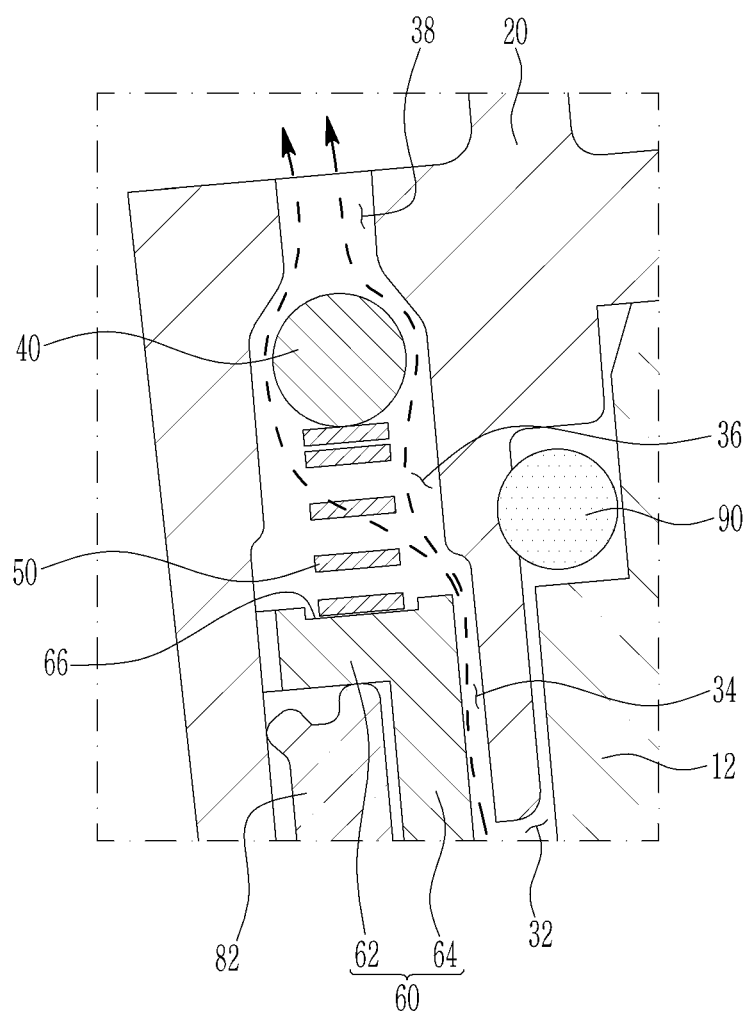
FIG. 4 and FIG. 5 is an enlarged view of A of FIG. 3.
Figure 5:
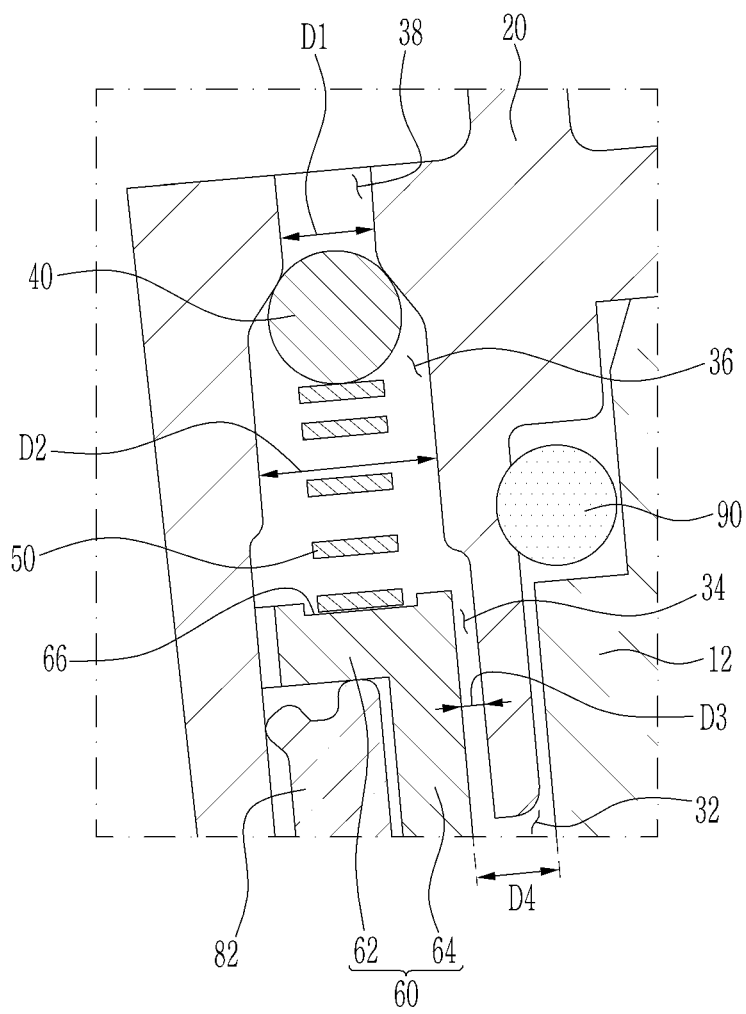

FIG. 3 is a cross-sectional view showing an air release structure of an integrated flow control mechanism according to various exemplary embodiments of the present disclosure, and FIG. 4 and FIG. 5 is an enlarged view of A of FIG. 3.

Hereinafter, an air release structure of the integrated flow control mechanism according to various exemplary embodiments of the present disclosure will be described with reference to FIG. 1 to FIG. 5.

The air release structure of the integrated flow control mechanism 10 according to various exemplary embodiments of the present disclosure may include the radiator nipple 20 mounted on an upper portion of the flow control housing 12 and forming a bypass passage portion 30 together with the flow control housing 12, a float 40 provided in the bypass passage portion 30, and an elastic member 50 to support the float 40 elastically.

Here, the float 40 includes, for example, a de-gassing ball, but is not limited thereto, and may be configured in various forms.

The elastic member 50 may include a wave spring. That is, the wave spring supports the float 40 to allow the exhaust of air and block the exhaust of coolant.

The bypass passage portion 30 may be formed on a side of a coupling portion of the radiator nipple 20 and the flow control housing 12. Therefore, the bypass passage portion 30 may be formed without major change in the existing shape of the general flow control mechanism to perform the air release function.

The air release structure of the integrated flow control mechanism 10 according to various exemplary embodiments of the present disclosure may further include a retainer 60 provided to fix the radiator nipple 20.

The air release structure of the integrated flow control mechanism 10 according to various exemplary embodiments of the present disclosure may further include the ball valve 70 provided inside the flow control housing 12 to control the coolant flow according to its rotation, and a radiator seal 80 provided to contact with the ball valve 70.

For example, the retainer 60 may secure the radiator nipple 20 to the flow control housing 12. Furthermore, the retainer 60 may combine the radiator seal 80 and the radiator nipple 20.

Also, the retainer 60 may support the elastic member 50.

That is, the retainer 60 may include an upper body 62 supporting the elastic member 50, and a lower body 64 extending from the upper body 62 and forming a micro passage 34 with the radiator nipple 20.

The upper body 62 supports the elastic member 50, and may adhere to the radiator nipple 20, and the lower body 64 may be bent at the upper body 62 to form the micro passage 34. That is, the cross-section shape of the retainer 60 may be formed as an "L" shape.

A seating groove 66 in which the elastic member 50 is accommodated may be formed on the upper body 62.

The air release structure of the integrated flow control mechanism 10 according to various exemplary embodiments of the present disclosure may further include a lip seal 82 mounted between the radiator seal 80 and the radiator nipple 20. The lip seal 82 may prevent coolant from leaking.

The retainer 60 may combine the radiator nipple 20, the radiator seal 80 and the lip seal 82.

The air release structure of the integrated flow control mechanism 10 according to various exemplary embodiments of the present disclosure may further include an O-ring 90 mounted between the radiator nipple 20 and the flow control housing 12, and the O-ring 90 may prevent leakage of coolant to the outside.

The bypass passage portion 30 is formed in the radiator nipple 20, and may include an outlet 38 selectively blocked by the float 40, a bypass chamber 36 provided with the float 40 and the elastic member 50, and the micro passage 34.

The bypass passage portion 30 may further include an inlet 32 formed between the radiator nipple 20 and the flow control housing 12.

The diameter D2 of the bypass chamber 36 may be greater than the diameter D1 of the outlet 38, and the diameter D3 of the micro passage 34 may be smaller than the diameter D2 of the bypass chamber 36.

The diameter D2 of the bypass chamber 36 may have a diameter greater than the diameter D1 of the outlet 38 so that the float 40, which is greater than the diameter D1 of the outlet 38, is provided.

The diameter D3 of the micro passage 34 is small to suppress the flow of coolant and allow only the flow of air when air bubbles are formed within the integrated flow control mechanism 10, that is, smaller than the diameter D2 of the bypass chamber 36, the diameter D3 of the micro passage 34 may be smaller than the diameter D1 of the outlet 38.

Also, diameter D3 of the micro passage 34 may be smaller than the diameter D4 of the inlet 32.

Hereinafter, referring to FIG. 4 and FIG. 5, the operation of the air release structure of the integrated flow control mechanism according to various exemplary embodiments of the present disclosure will be described.

Referring to FIG. 4, when coolant delivery to the radiator nipple 20 direction is blocked by the ball valve 70 and the coolant containing air or bubbles are generated, the air or air bubbles are collected at the top portion of the flow control housing 12 and delivered to the micro passage 34 through the inlet 32.

Because the diameter D3 of the micro passage 34 is smaller than the diameter D4 of the inlet 32, air or bubbles are separated from the coolant and inflow into the bypass chamber 36. Accordingly, the float 40 descends by the weight of the float 40, the outlet 38 is opened and air or bubble is exhausted along the arrow direction in the drawing in the direction of the radiator nipple 20.

Exhausted air or bubbles may be delivered to a radiator and reservoir tank, not shown.

As shown in FIG. 5, when air or bubble is exhausted, the float 40 rises by coolant and the elastic member 50, the outlet 38 is blocked, and exhaust of coolant may be suppressed.

In winter, when air or bubble of flow control housing 12 is delivered to the heater, a flow noise may be generated from the heater core.

However, the air release structure of the integrated flow control mechanism according to various exemplary embodiments of the present disclosure may exhaust through the bypass passage portion, suppressing the flow sound from the heater core.

Furthermore, because the air release structure of the integrated flow control mechanism according to various exemplary embodiments of the present disclosure does not operate all the time, it is possible to suppress the flow of coolant and maintain fuel efficiency and heating performance.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An air release structure of an integrated flow control mechanism, the air release structure comprising:
   a flow control housing provided with an inlet port through which coolant inflows and a radiator port that exhausts the coolant through a radiator;
   a radiator nipple provided on an upper portion of the flow control housing, mounted on the radiator port and forming a bypass passage portion together with the flow control housing;
   a float provided in the bypass passage portion; and
   an elastic member to support the float elastically and to selectively open the bypass passage portion,
   wherein the bypass passage portion is formed on a side of the radiator nipple.

2. The air release structure of claim 1, wherein the elastic member includes a wave spring.

3. The air release structure of claim 1, wherein the bypass passage portion is formed on a side of the flow control housing.

4. The air release structure of claim 1, further including a retainer provided to fix the radiator nipple to the flow control housing.

5. The air release structure of claim 4, wherein the retainer supports the elastic member.

6. The air release structure of claim 5, wherein the retainer includes:
   an upper body supporting the elastic member; and
   a lower body extending from the upper body and forming a passage together with the radiator nipple.

7. The air release structure of claim 1, further including:
   a ball valve provided inside the flow control housing to control coolant flow according to a rotation of the ball valve; and
   a radiator seal provided to contact with the ball valve.

8. The air release structure of claim 7, further including a lip seal mounted between the radiator seal and the radiator nipple.

9. The air release structure of claim 8, wherein the lip seal is mounted between the radiator nipple, the radiator seal, and a retainer provided to fix the radiator nipple to the flow control housing.

10. The air release structure of claim 1, further including an O-ring mounted between the radiator nipple and the flow control housing.

11. The air release structure of claim 1, further including a heater nipple mounted to the flow control housing.

12. The air release structure of claim 1, further including a heat-exchange nipple mounted to the flow control housing.

13. The air release structure of claim 1, wherein the bypass passage portion includes:
   an outlet formed on the radiator nipple and selectively blocked by the float;
   a bypass chamber connected to the outlet and provided with the float and the elastic member and having a diameter greater than a diameter of the outlet; and
   a passage with a diameter smaller than the diameter of the bypass chamber, and connected to the bypass chamber.

14. The air release structure of claim 13, further including a retainer including:
   an upper body supporting the elastic member; and
   a lower body extending from the upper body and forming the passage between the lower body and the radiator nipple.

15. The air release structure of claim 14, wherein a lip seal is mounted between the radiator nipple and the lower body of the retainer.

16. The air release structure of claim 15, further including:
   a ball valve provided inside the flow control housing to control coolant flow according to a rotation of the ball valve; and
   a radiator seal provided to contact with the ball valve,
   wherein the lip seal is mounted between the radiator nipple, the radiator seal, and the lower body of the retainer.

17. The air release structure of claim 14, wherein a seating groove is formed on the upper body to accommodate the elastic member therein.

18. The air release structure of claim 17, wherein the bypass passage portion further includes an inlet formed between the radiator nipple and the flow control housing.

* * * * *